United States Patent
Ueda et al.

(10) Patent No.: US 7,559,019 B2
(45) Date of Patent: Jul. 7, 2009

(54) DOCUMENT STRUCTURE INSPECTION METHOD AND APPARATUS

(75) Inventors: Ryoichi Ueda, Yokohama (JP); Kojiro Nakayama, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 327 days.

(21) Appl. No.: 10/785,410

(22) Filed: Feb. 25, 2004

(65) Prior Publication Data

US 2004/0237039 A1   Nov. 25, 2004

(30) Foreign Application Priority Data

May 19, 2003   (JP)   ............................. 2003-140568

(51) Int. Cl.
*G06F 17/00* (2006.01)
(52) U.S. Cl. .................... 715/234; 715/237; 715/239
(58) Field of Classification Search ................ 715/513, 715/523, 515, 234, 237, 239
See application file for complete search history.

(56) References Cited

U.S. PATENT DOCUMENTS

| | | | | |
|---|---|---|---|---|
| 6,014,680 A * | 1/2000 | Sato et al. | .................... | 715/513 |
| 6,922,697 B1 * | 7/2005 | Suehira | ...................... | 707/102 |
| 7,016,963 B1 * | 3/2006 | Judd et al. | ................... | 709/228 |
| 7,260,724 B1 * | 8/2007 | Dickinson et al. | ........... | 713/182 |
| 2003/0093760 A1 * | 5/2003 | Suzuki et al. | ............... | 715/523 |
| 2004/0034521 A1 * | 2/2004 | Kawakura et al. | .............. | 704/1 |
| 2005/0022115 A1 * | 1/2005 | Baumgartner et al. | ....... | 715/513 |

FOREIGN PATENT DOCUMENTS

| | | |
|---|---|---|
| JP | 9-69101 | 3/1997 |
| JP | 10-143507 | 5/1998 |
| JP | 2001-067348 | 3/2001 |

OTHER PUBLICATIONS

"Xerces2 Components", Feb. 24, 2003, Apache Software Foundation.
Nagao Makoto et al., "Iwanami Software Science Series 15 Natural Language Processing", 1st Edition, Iwanami Bookstore Co., Ltd. Apr. 26, 1996, p. 141.144. (English Translation).
Notification of Reason for Rejection dated Mar. 27, 2007.

(Continued)

*Primary Examiner*—Stephen S Hong
*Assistant Examiner*—Matthew J Ludwig
(74) *Attorney, Agent, or Firm*—McDermott Will & Emery LLP

(57) ABSTRACT

Structured documents written in a document structure definition language may be inconsistent with a predetermined document structure definition when they are encrypted partly or electronically signed. The document structure inspection method according to the present invention applies a document structure alteration rule to a document structure definition expressing the structure of such structured documents and effects conversion to generate a second document structure definition. The second document structure definition is then checked to determine whether it is consistent with a corresponding, predetermined document structure definition. The document structure alteration rule includes, for instance, a replacement rule for replacing an element contained in a document structure definition by another element, and an addition rule for adding an element to a location after the target document structure definition element.

3 Claims, 21 Drawing Sheets

OTHER PUBLICATIONS

"Properties for enabling schema validation." Java API for XML Processing Version 1.2, Sep. 6, 2002, pp. 27-30.
"Properties for enabling schema validation." Java API for XML Processing Version 1.2, Sep. 6, 2002, pp. 27-30.
The Apache Software Foundation, "Xerces 2 Java Parser Readme." http://xml.apache.org/xerces2-j/index.html pp. 1.
LuMrix, "XML Tools." Online: http://puvogel.informatik.med.uni-giessen.de/lumrix/ pp. 1.

* cited by examiner

FIG. 3

```
01  <!DOCTYPE PurchaseOrder[
02    <!ELEMENT PurchaseOrder (UserID, Price, CreditCard)>
03     <!ATTLIST PurchaseOrder Id ID #IMPLIED>          320
04    <!ELEMENT UserID (#PCDATA)>
05    <!ELEMENT Price (#PCDATA)>
06    <!ELEMENT CreditCard (Issure, Number, Expire, Owner)>
07    <!ELEMENT Issure (#PCDATA)>
08    <!ELEMENT Number (#PCDATA)>
09    <!ELEMENT Expire (#PCDATA)>
10    <!ELEMENT Owner (#PCDATA)>
11 ]>
```

FIG. 4

```
01   <?Xml version="1.0"?>
02   <!DOCTYPE PurchaseOrder SYSTEM "PurchaseOrder.dtd">
03   <PurchaseOrder>
04     <UserID>10194970</UserID>
05     <Price>100000</Price>
06     <CreditCard>
07       <Issur>SDL</Issuer>
08       <Number>1234-5678-9012-3456</Number>
09       <Expire>12/05</Expire>
10       <Owner>Larry Gates</Owner>
11     </CreditCard>
12   </PurchaseOrder>
```

FIG. 5

| # | TYPE | APPLIED LOCATION | OPERATION ELEMENT | RELEVANT DOCUMENT STRUCTURE DEFINITIONS |
|---|---|---|---|---|
| 1 | Replace | PurchaseOrder.dtd:/PurchaseOrder/CreditCard | EncryptedData.dtd:/EncryptedData | EncryptedData.dtd KeyInfo.dtd |
| 2 | Add | PurchaseOrder.dtd:/PurchaseOrder/last() | EncryptedKey.dtd:/EncryptedKey | EncryptedKey.dtd |
| 3 | Add | PurchaseOrder.dtd:/PurchaseOrder/last() | Signature.dtd:/Signature | Signature.dtd |

FIG. 6

```
601
01  <!DOCTYPE EncryptedData[
02    <!ELEMENT EncryptedData (EncryptionMethod,KeyInfo,CipherData)>
03      <!ATTLIST EncryptedData Id ID #REQUIRED>
04    <!ELEMENT EncryptionMethod(#PCDATA)>
05      <!ATTLIST EncryptionMethod Algorithm CDATA #REQUIRED>
06    <!ELEMENT CipherData(CipherValue)>
07    <!ELEMENT CipherValue(#PCDATA)>
08  ]>
```

FIG. 7

```
01 <!DOCTYPE EncryptedKey [
02  <!ELEMENT EncryptedKey (EncryptionMethod,KeyInfo,CipherData,ReferenceList)>
03   <!ATTLIST EncryptedKey Id ID #REQUIRED>
04  <!ELEMENT ReferenceList (DataReference | Key Reference)+>
05  <!ELEMENT DataReference (#PCDATA) >
06   <!ATTLIST DataReference URI CDATA #REQUIRED>
07  <!ELEMENT KeyReference (#PCDATA) >
08   <!ATTLIST KeyReference URI CDATA #REQUIRED>
09 ]>
```

FIG. 8

```
01 <!DOCTYPE Signature [
02   <!ELEMENT Signature (SignedInfo, SignatureValue, KeyInfo?) >
03   <!ELEMENT SignedInfo (CanonicalizationMethod, SignatureMethod, Reference+) >
04   <!ELEMENT CanonicalizationMethod (#PCDATA) >
05     <!ATTLIST CanonicalizationMetod Algorithm CDATA #REQUIRED>
06   <!ELEMENT SignatureMethod (#PCDATA) >
07     <!ATTLIST SignatureMethod Algorithm CDATA #REQUIRED>
08   <!ELEMENT Reference (DigestMethod, DigestValue) >
09     <!ATTLIST Reference URI CDATA #REQUIRED>
10   <!ELEMENT DigestMethod (#PCDATA) >
11     <!ATTLIST DigestMethod Algorithm CDATA #REQUIRED>
12   <!ELEMENT DigestValue (#PCDATA) >
13   <!ELEMENT SignatureValue (#PCDATA) >
14 ]>
```

FIG. 9

```
01 <!DOCTYPE KeyInfo[
02   <!ELEMENT KeyInfo(RetrievalMethod | KeyName)>
03   <!ELEMENT RetrievalMethod(#PCDATA)>
04    <!ATTLIST RetrievalMethod
05         Type      CDATA      #REQUIRED
06         URI       CDATA      #REQUIRED>
07   <!ELEMENT KeyName(#PCDATA)>
08 ]>
```

FIG. 11

```
01 <!DOCTYPE PurchaseOrder [
02   <!ELEMENT PurchaseOrder (UserId, Price, EncryptedData;) >
03   <!ATTLIST PurchaseOrder Id ID #IMPLIED>
04   <!ELEMENT UserID (#PCDATA) >
05   <!ELEMENT Price (#PCDATA) >
06   <!ELEMENT CreditCard (Issuer, Number, Expire, Owner) >
07   <!ELEMENT Issuer (#PCDATA) >
08   <!ELEMENT Number (#PCDATA) >
09   <!ELEMENT Expire (#PCDATA) >
10   <!ELEMENT Owner (#PCDATA) >
11   <!ELEMENT EncryptedData (EncryptionMethod, KeyInfo, CipherData) >
12   <!ATTLIST EncryptedData Id ID #IMPLIED>
13   <!ELEMENT EncryptionMethod (#PCDATA) >
14   <!ATTLIST EncryptionMethod Algorithm CDATA #REQUIRED>
15   <!ELEMENT CipherData (CipherValue) >
16   <!ELEMENT CipherValue (#PCDATA) >
17   <!ELEMENT KeyInfo (EncryptedKey?, (RetrievalMethod | KeyName)) >
18   <!ELEMENT RetrievalMethod (#PCDATA) >
19     <!ATTLIST RetrievalMethod>
20       Type  CDATA    #REQUIRED
21       URI   CDATA    #REQUIRED>
22   <!ELEMENT KeyName (#PCDATA) >
23 ]>
```

FIG. 12

```
01 <!DOCTYPE PurchaseOrder[
02   <!ELEMENT PurchaseOrder(UserID,Price,EncryptedData, EncryptedKey)>
03     <!ATTLIST PurchaseOrder Id ID #IMPLIED>
04   <!ELEMENT UserID(#PCDATA)>
05   <!ELEMENT Price(#PCDATA)>
06   <!ELEMENT CreditCard(Issure,Number,Expire,Owner)>
07   <!ELEMENT Issure(#PCDATA)>
08   <!ELEMENT Number(#PCDATA)>
09   <!ELEMENT Expire(#PCDATA)>
10   <!ELEMENT Owner(#PCDATA)>

11   <!ELEMENT EncryptedData(EncryptionMethod,KeyInfo,CipherData)>
12     <!ATTLIST EncryptedData Id ID #IMPLIED>
13   <!ELEMENT EncryptionMethod(#PCDATA)>
14     <!ATTLIST EncryptionMethod Algorithm CDATA #REQUIRED>
15   <!ELEMENT CipherData(CipherValue)>
16   <!ELEMENT CipherValue(#PCDATA)>

17   <!ELEMENT KeyInfo(EncryptedKey?, (RetrievalMethod | KeyName))>
18   <!ELEMENT RetrievalMethod(#PCDATA)>
19     <!ATTLIST RetrievalMethod>
20       Type    CDATA    #REQUIRED
21       URI     CDATA    #REQUIRED>
22   <!ELEMENT KeyName(#PCDATA)>

23   <!ELEMENT EncryptedKey(EncryptionMethod,KeyInfo,CipherData,ReferenceList)>
24     <!ATTLIST EncryptedKey Id ID #IMPLIED>
25   <!ELEMENT ReferenceList(DataReference | KeyReference)+>
26   <!ELEMENT DataReference(#PCDATA)>
27     <!ATTLIST DataReference URI CDATA #REQUIRED>
28   <!ELEMENT KeyReference(#PCDATA)>
29     <!ATTLIST KeyReference URI CDATA #REQUIRED>
30 ]>
```

FIG. 13

```
01 <!DOCTYPE PurchaseOrder[
02   <!ELEMENT PurchaseOrder (UserID, Price, EncryptedData, EncryptedKey, Signature)>
03     <!ATTLIST PurchaseOrder Id ID #IMPLIED>                                1311
04   <!ELEMENT UserId(#PCDATA)>
05   <!ELEMENT Price(#PCDATA)>
06   <!ELEMENT CreditCard(Issure, Number, Expire, Owner)>
07   <!ELEMENT Issure(#PCDATA)>
08   <!ELEMENT Number(#PCDATA)>
09   <!ELEMENT Expire(#PCDATA)>
10   <!ELEMENT Owner(#PCDATA)>

11   <!ELEMENT EncryptedData(EncryptionMethod, KeyInfo, CipherData)>
12     <!ATTLIST EncryptdData Id ID #IMPLIED>
13   <!ELEMENT EncryptionMethod(#PCDATA)>
14     <!ATTLIST EncryptionMethod Algorithm CDATA #REQUIRED>
15   <!ELEMENT CipherData(CipherValue)>
16   <!ELEMENT CipherValue(#PCDATA)>

17   <!ELEMENT KeyInfo(EncryptedKey?, (RetrievalMethod | KeyName))>
18   <!ELEMENT RetrievalMethod(#PCDATA)>
19     <!ATTLIST RetrievalMethod
20           Type        CDATA       #REQUIRED
21           URI         CDATA       #REQUIRED>
22   <!ELEMENT KeyName(#PCDATA)>

23   <!ELEMENT EncryptedKey(EncryptionMethod, KeyInfo, CipherData, ReferenceList)>
24     <!ATTLIST EncryptedKey Id ID #IMPLIED>
25   <!ELEMENT ReferenceList(DataReference | KeyReference)+>
26   <!ELEMENT DataReference(#PCDATA)>
27     <!ATTLIST DataReference URI CDATA #REQUIRED>
28   <!ELEMENT KeyReference(#PCDATA)>
29     <!ATTLIST KeyReference URI CDATA #REQUIRED>                    1312

30   <!ELEMENT Signature(SignedInfo, SignatureValue, KeyInfo?)>
31   <!ELEMENT SignedInfo(CanonicalizationMethod, SignatureMethod, Reference+)>
32   <!ELEMENT CanonicalizationMethod(#PCDATA)>
33     <!ATTLIST CanonicalizationMethod Algorithm CDATA #REQUIRED>
34   <!ELEMENT SignatureMethod(#PCDATA)>
35     <!ATTLIST SignatureMethod Algorithm CDATA #REQUIRED>
36   <!ELEMENT Reference(DigesMethod, DigestValue)>
37     <!ATTLIST Reference URI CDATA #REQUIRED>
38   <!ELEMENT DigestMethod(#PCDATA)>
39     <!ATTLIST DigestMethod Algorithm CDATA #REQUIRED>
40   <!ELEMENT DigestValue(#PCDATA)>
41   <!ELEMENT SignatureValue(#PCDATA)>
42 ]>
```

FIG. 14

```
01 <?Xml version="1.0"?>
02 <!DOCTYPE PurchaseOrder SYSTEM "PurchaseOrder.dtd">
03 <PurchaseOrder Id="po">
04    <UserID>10194970</UserID>
05    <Price>100000</Price>
06    <EncryptedData Id="poED">                                           ┐
07       <EncryptionMethod Algorithm="http://www.w3.org/xmlenc#aes128"/>  │ 1411
08       <KeyInfo>
09          <RetrievalMethod Type="http://www.w3.org/xmlenc#EncryptedKey"
10             URI="#poEK"/>
11       </KeyInfo>
12       <CipherData>
13          <CipherValue>SrYKzOa6iu/gi......y5UZhTTaY9</CipherValue>
14       </CipherData>
15    </EncryptedData>
16    <EncryptedKey Id="poEK">                                            ┐
17       <EncrypitionMethod Algorithm="http://www.w3.org/xmlenc#rsa"/>    │ 1412
18       <KeyInfo>
19          <KeyName>poWrapKey</KeyName>
20       </KeyInfo>
21       <CipherData>
22          <CipherValue>kjZVmUbShov4v......wqbYwQri7QH</CipherValue>
23       </CipherData>
24       <ReferenceList>
25          <DataReference URI="#poED"/>
26       </ReferenceList>
27    </EncryptedKey>
28    <Signature>                                                         ┐
29       <SignedInfo>                                                     │ 1413
30          <CanonicalizationMethod Algorithm ="http://www.w3.org/xml#c14n"/>
31          <SignatureMethod Algorithm ="http://www.w3.org/xmldsg#rsa-sha1"/>
32          <Reference URI="#po">
33             <DigestMethod Algorithm ="http://www.w3.org/xmldsig#sha1"/>
34             <DigestValue>AZAOVqTorSSJ70BCA/tLY93rFMs=</DigestValue>
35          </Reference>
36       </SignedInfo>
37       <SignatureValue>ZknU0aJsxNR5......InHhiG25PKg==</SignatureValue>
38       <KeyInfo>
39          <KeyName>Hitachi.SDL</KeyName>
40       </KeyInfo>
41    </Signature>
42 </PurchaseOrder>
```

| # | TYPE | APPLIED LOCATION | OPERATION ELEMENT | RELEVANT DOCUMENT STRUCTURE DEFINITIONS |
|---|------|------------------|-------------------|------------------------------------------|
| 4 | Add | Signature.dtd:/Signature/last() | PurchaseOrder.dtd:/PurchaseOrder | PurchaseOrder.dtd KeyInfo.dtd |

```
01 <!DOCTYPE Signature [
02   <!ELEMENT Signature(SignedInfo,SignatureValue,KeyInfo?, PurchaseOrder )>   1611
03   <!ELEMENT SignedInfo(CanonicalizationMethod,SignatureMethod,Reference+)>
04   <!ELEMENT CanonicalizationMethod(#PCDATA)>
05     <!ATTLIST CanonicalizationMethod Algorithm CDATA #REQUIRED>
06   <!ELEMENT SignatureMethod(#PCDATA)>
07     <!ATTLIST SignatureMethod Algorithm CDATA #REQUIRED>
08   <!ELEMENT Reference(DigestMethod,DigestValue)>
09     <!ATTLIST Reference URI CDATA #REQUIRED>
10   <!ELEMENT DigestMethod(#PCDATA)>
11     <!ATTLIST DigestMethod Algorithm CDATA #REQUIRED>
12   <!ELEMENT DigestValue(#PCDATA)>
13   <!ELEMENT SignatureValue(#PCDATA)>
14   <!ELEMENT PurchaseOrder(UserID,Price,CreditCard)>                           1612
15     <!ATTLIST PurchaseOrder Id ID #IMPLIED>
16   <!ELEMENT UserID(#PCDATA)>
17   <!ELEMENT Price(#PCDATA)>
18   <!ELEMENT CreditCard(Issuer,Number,Expire,Owner)>
19   <!ELEMENT Issuer(#PCDATA)>
20   <!ELEMENT Number(#PCDATA)>
21   <!ELEMENT Expire(#PCDATA)>
22   <!ELEMENT Owner(#PCDATA)>
23   <!ELEMENT KeyInfo(EncryptedKey?,(RetrievalMethod | KeyName))>               1613
24   <!ELEMENT RetrievalMethod(#PCDATA)>
25     <!ATTLIST RetrievalMetod>
26        Type      CDATA       #REQUIRED
27        URI       CDATA       #REQUIRED>
28   <!ELEMENT KeyName(#PCDATA)>
29 ]>
```

FIG. 18

| # | TYPE | APPLIED DEFINITION | OPERATION ELEMENT | RELEVANT DOCUMENT STRUCTURE DEFINITIONS |
|---|---|---|---|---|
| 1 | Replace | * | EncryptedData.dtd:/EncryptedData | EncryptedData.dtd<br>KeyInfo.dtd |
| 2 | Add | * | EncryptedKey.dtd:/EncryptedKey | EncryptedKey.dtd<br>KeyInfo.dtd |
| 3 | Add | * | Signature.dtd:/Signature | Signature.dtd<br>KeyInfo.dtd |
| 4 | Add | Signature.dtd | PurchaseOrder.dtd:/PurchaseOrder | PurchaseOrder.dtd<br>KeyInfo.dtd |

FIG. 20

| 2001 | PurchaseOrder.dtd | /PurchaseOrder/CreditCard | Replace |
|---|---|---|---|
| | | | |
| | | | |

FIG. 21

| PurchaseOrder.dtd | /PurchaseOrder/CreditCard/after () | Replace |
|---|---|---|
| | | |
| | | |

FIG. 22

```
01 <!DOCTYPE PurchaseOrder [
02   <!ELEMENT PurchaseOrder(UserID,Price,EncryptedData)>
03     <!ATTLIST PurchaseOrder Id ID #IMPLIED>
04   <!ELEMENT UserID(#PCDATA)>
05   <!ELEMENT Price(#PCDATA)>
06   <!ELEMENT CreditCard(Issuer,Number,Expire,Owner)>
07   <!ELEMENT Issur(#PCDATA)>
08   <!ELEMENT Number(#PCDATA)>
09   <!ELEMENT Expire(#PCDATA)>
10   <!ELEMENT Owner(#PCDATA)>
11   <!ENTITY %EncryptedDataRef SYSTEM "EncryptedData.dtd">
12   %EncryptedDataRef;
13   <!ENTITY % KeyInforRef SYSTEM "KeyInfo.dtd">
14   %KeyInfoRef;
15 ]>
```

2201, 2211, 2212

DOCUMENT STRUCTURE INSPECTION METHOD AND APPARATUS

The present application claims priority from the Japanese patent application JP2003-140568 filed on May 19, 2003, the content of which is hereby incorporated by reference into this application.

BACKGROUND OF THE INVENTION

The present invention relates to a structure inspection method for a structured document.

In a computer system where a process request is received via a communication network to perform a requested application process, the data structure of an electronic document describing the request is generally checked for consistency with a predetermined structure each time it is received. The computer used in the system performs the requested application process and returns the result only when the document structure is consistent with the predetermined structure. If, on the other hand, the document structure is inconsistent with the predetermined structure, the computer returns an error to the requesting source.

The above document structure inspection process can be performed simultaneously with an application process. However, if any document structure inconsistency is found at a final stage of the application process, all the previously performed application process steps are wasted so that the processing efficiency decreases. To prevent the processing efficiency from decreasing, it is preferred that the entire document structure be inspected before the application process. This also holds true when the received electronic document is expressed in XML (Extensible Markup Language).

The interface of an inspection process for checking whether the structures of various structured documents are consistent with a predefined document structure is stipulated as described under "Schema Validation" in "Java API for XML Processing Version 1.2 Final Release" (Reference Document 1), which is written by Rajiv Mordani et al. with reference to Java (registered trademark of Sun Microsystems). Further, "Xerces 2 Java Parser Readme" (Reference Document 2) of the Apache Software Foundation describes how to implement a structure inspection process for such structured documents.

In a computer system for transmitting/receiving electronic documents via a communication network, the electronic documents to be transmitted may be electronically signed by a sender or encrypted for the purpose of preventing the transmitted documents from being falsified or viewed by an unauthorized person.

In a computer system comprising a plurality of computers, which sequentially perform various processes to carry out a complicated process as a whole, a process requesting person, who is the initial sender, may electronically sign or encrypt part of the data to be transmitted.

The above processing operation is performed, for instance, for on-line shopping. When a payment is made with a credit card for on-line shopping purposes, the data to be transmitted from the purchaser (initial sender) to an on-line shopping site manager includes the information identifying the item to be purchased and the information identifying the credit card (card number, expiration date, etc.) used for payment. The information about the credit card is forwarded from the on-line shopping site manager to a credit card company where a credit-card settlement process is performed. The on-line shopping site manager does not directly use the credit card information, but receive it from the purchaser and relay it to the credit card company.

In the system described above, a higher degree of safety is achieved by the use of a transmission method in which the purchaser encrypts part of the credit card information so as to permit only the credit card company to decrypt it while keeping it from being disclosed to the on-line shopping site manager than the use of a transmission method in which the data to be transmitted is entirely encrypted by the on-line shopping site manager. In this instance, the encrypted data may be electronically signed (partial signature) to indicate that the credit card information is encrypted by the purchaser. It is anticipated that the above electronic transactions will prevail in the future due to widespread use of a public key cryptography technology.

There is a technology that converts a document structure definition written in a certain document structure definition language into an equivalent document structure definition written in another language. For example, a conversion tool named "dtd2xs" is introduced in "LuMrix, 'XML Tools', 'online', 2003, [retrieved on Feb. 14, 2003], Internet <URL: http://puvogel.informatik.med.uni-giessen.de/lumrix/#dtd>" (Reference Document 3). This tool converts a document structure definition written in document definition language DTD into an equivalent document structure definition written in "W3C XML Schema". When used to effect conversion among various document structure definition languages, however, the tool does not yield a perfectly equivalent document structure definition due, for instance, to different description capabilities of the document structure definition languages.

SUMMARY OF THE INVENTION

When the structured document to be transmitted/received is signed, encrypted, or otherwise processed using a conventional technology as described above, the document structure changes. Therefore, the same structure inspection method cannot be used as for documents that are not signed, encrypted, or otherwise processed. If the structured document to be transmitted/received is merely signed, a structure inspection can be conducted after the entire signature is removed. However, the structure inspection cannot be conducted if the on-line shopping site manager receives encrypted credit card information that the on-line shopping site manager cannot decrypt, as described earlier.

It is an object of the present invention to make it possible to entirely inspect the structure of a structured document even when it is changed by signing or encrypting the structured document wholly or partly or when an encrypted portion cannot be decrypted by an inspector.

To handle a structured document whose structure may be changed, for instance, by electronically signing an electronic structured document or by encrypting part of such a document and achieve the above object, the present invention sets up a document structure alteration rule, converts the document structure definition into a signed/encrypted document structure definition before inspecting the document structure definition, which expresses the structured document structure, and conducts a document structure inspection of the converted document structure definition.

BRIEF DESCRIPTION OF THE DRAWINGS

FIG. 3 shows an example of a document structure definition;

FIG. 4 shows an example of a structured document;

FIG. 5 shows an example of a document structure alteration rule library according to a first embodiment of the present invention;

FIG. 6 shows an example of a document structure definition;

FIG. 7 shows an example of a document structure definition;

FIG. 8 shows an example of a document structure definition;

FIG. 9 shows an example of a document structure definition;

FIG. 11 shows an example of a document structure definition to which document structure alteration rule 1 has been applied;

FIG. 12 shows an example of a document structure definition to which document structure alteration rules 1 and 2 have been applied;

FIG. 13 shows an example of a document structure definition to which document structure alteration rules 1, 2, and 3 have been applied;

FIG. 14 shows an example of a structured document whose structure has been altered;

FIG. 15 shows an example of a document structure alteration rule;

FIG. 16 shows an example of a document structure definition to which document structure alteration rule 4 has been applied;

FIG. 18 shows an example of a document structure alteration rule library according to the second embodiment of the present invention;

FIG. 20 illustrates the status of a stack;

FIG. 21 illustrates the status of a stack; and

FIG. 22 shows an example of a document structure definition that is formulated by means of referencing.

DETAILED DESCRIPTION OF THE INVENTION

A document structure inspection method and apparatus that can cope with signature- or encryption-induced structural changes in a structured document will be described below. The present invention can also cope with document structure changes that are applied by an operation other than a signature or encryption.

Figure 1:
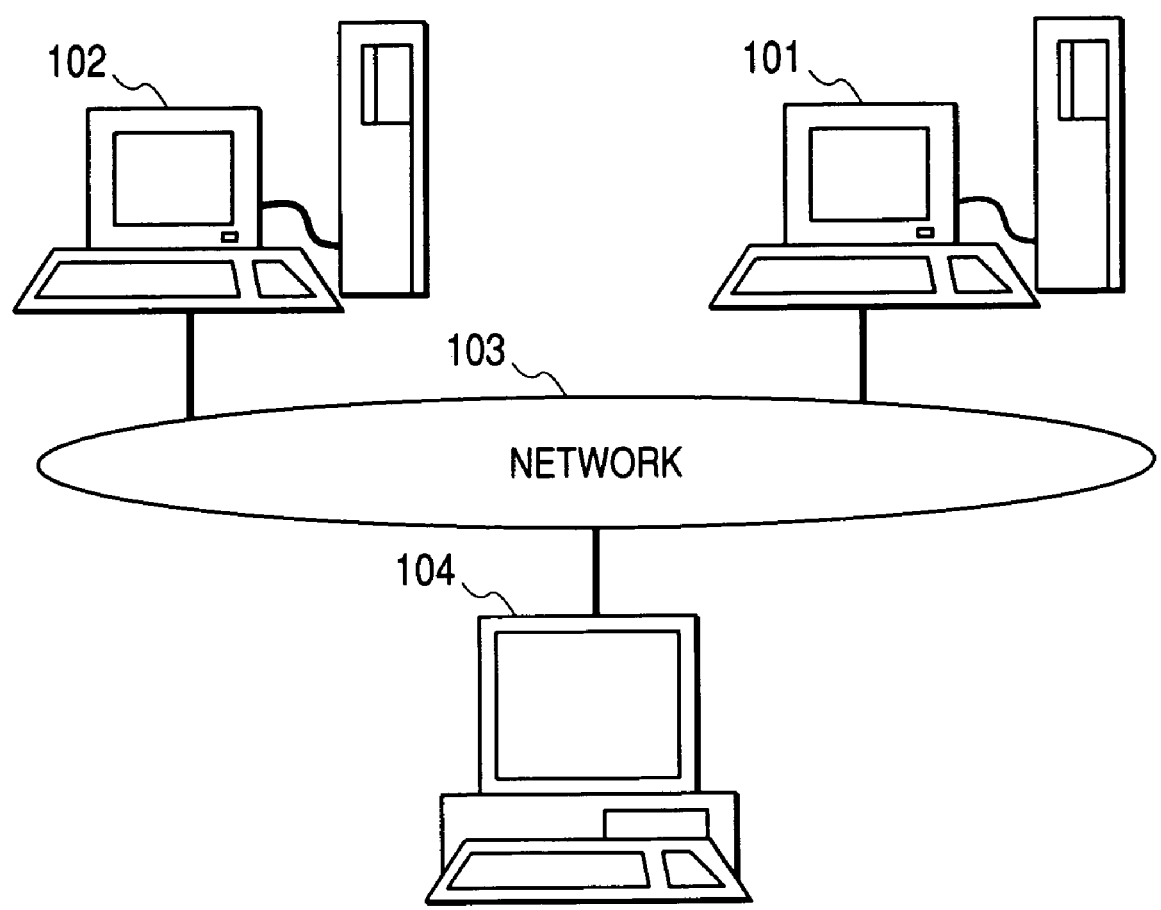
FIG. 1 illustrates a computer environment.

A first embodiment of the present invention will now be described with reference to the accompanying drawings. As shown in FIG. 1, the present invention relates to an inspection method and system in which a document recipient checks whether the data structure of a received document is consistent with a predetermined one in an environment where a plurality of computers 101, 102, 104 are interconnected via a hard-wired or wireless network 103 to mutually exchange information.

The description of the present embodiment assumes that information is exchanged between two parties. However, the present invention can also be applied to the communication between two arbitrary parties in a situation where three or more parties are involved in information exchange. More specifically, when the communication involves three parties so that sender A transmits information to recipient C via recipient B, the present invention is applicable to two two-party communications, that is, the information transmission from sender A to recipient B and the information transmission from sender B to recipient C.

Figure 2:
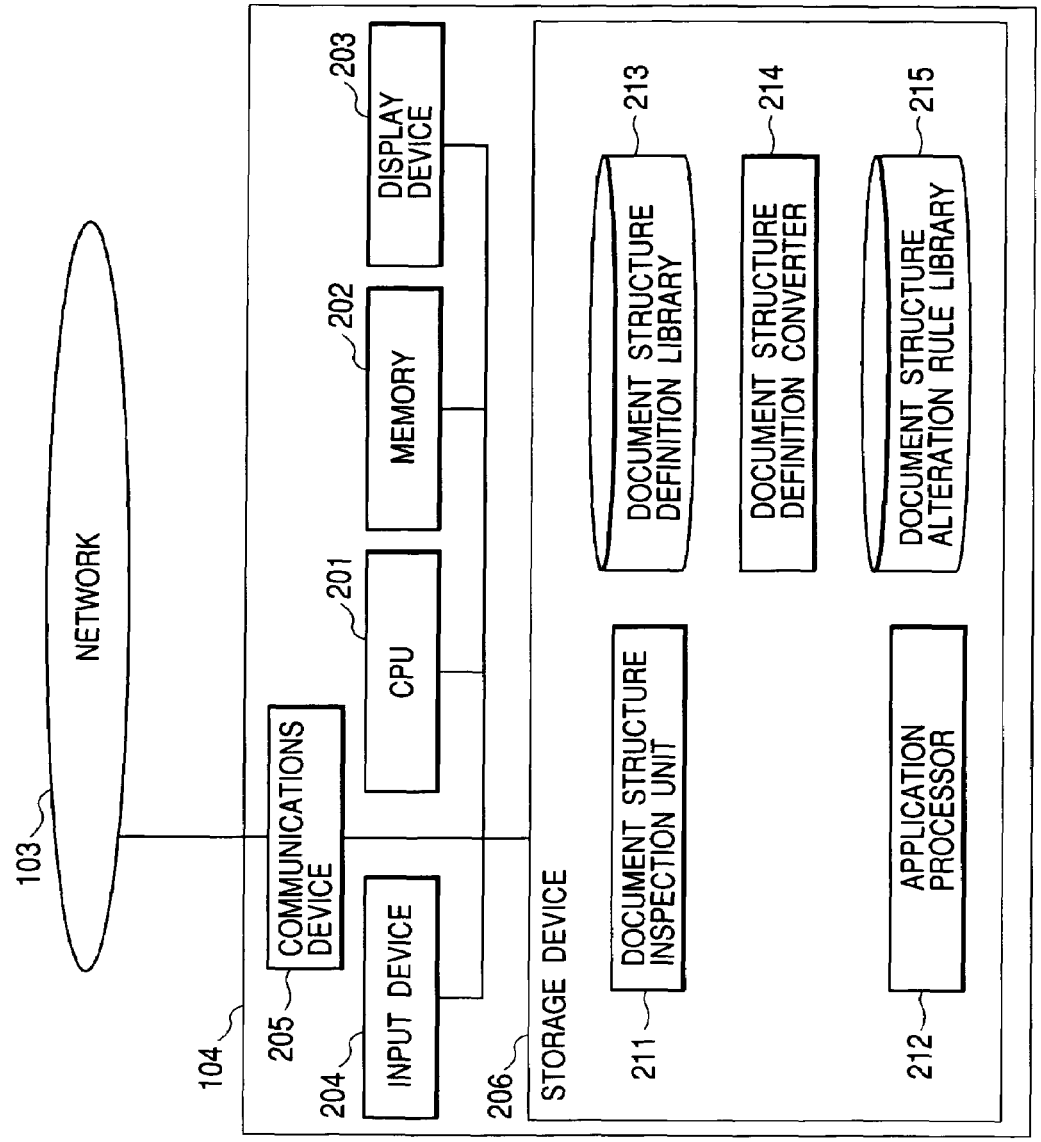
FIG. 2 illustrates the internal hardware configuration of a computer.

FIG. 2 illustrates the configuration of a recipient's computer. The recipient's computer 104 comprises a CPU 201, a memory 202, a display device 203, an input device 204, a communications device 205, and a storage device 206, and is connected to the network 103. The storage device 206 stores a document structure inspection unit 211, an application processor 212, a document structure definition library 213, a document structure definition converter 214, and a document structure alteration rule library 215. The document structure inspection unit 211 is a program for inspecting the structure of a received document. The application processor 212 is a program for processing an application request included in the received document. The document structure definition library 213 stores a document structure definition that describes the structure of the received document. The document structure alteration rule library 215 stores document structure alteration rules, which state how the document structure is altered by an digital signature, encryption, or other operation performed on the outgoing document. The document structure definition converter 214 is a program for converting the document structure definition in compliance with a document structure alteration rule.

The document structure inspection unit 211, application processor 212, and document structure definition converter 214, which are stored in the storage device 206, are loaded into the memory and executed by the CPU. The present invention is implemented in this manner.

The document structure inspection unit 211 according to the first embodiment is the same as disclosed in Reference Document 2. More specifically, the document structure inspection unit 211 conducts an inspection on an individual element name basis to determine whether a received structured document is consistent with the corresponding document structure definition. If the inspection reveals that the received document is consistent with the definition, the application processor 212 performs an application process in compliance with a request specified by the received document. Prior to document structure inspection, the document structure definition converter 214 performs a document structure definition conversion process on the received document in compliance with a document structure alteration rule. After completion of the conversion process, the document structure inspection unit 211 conducts an inspection in accordance with the document structure definition.

FIG. 3 shows an example of a document structure definition that is contained in the document structure definition library 213. This document structure definition is written in DTD (Document Type Definition). DTD is a document structure definition language that is designed to define the structure of XML and other documents. Although the definition is written in DTD in this example, the document structure may be defined in some other document structure definition language. An XML document is an aggregate of elements of a nested structure. The leading element is called a "root element". When element E is included in element F, the relationship between elements E and F is called a "parent-child relationship". Element E is referred to as a "parent element" for element F. Element F is referred to as a "child element" for element E. Elements having the same parent element are called "sibling elements". Each element can have zero or more attributes.

For explanation purposes, a 2-digit line number is attached to the beginning each line of document structure definition in FIG. 3. However, the real document structure definition does not contain any line number. Similarly, the structured documents and document structure definitions referenced for subsequent explanations are provided with line numbers. However, such line numbers are not included in the actual structured documents or document structure definitions.

The first line (line No. 1) in FIG. 3 indicates that the root element is "PurchaseOrder". The second line (line No. 2) indicates that the "PurchaseOrder" element has three child elements ("UserID", "Price", and "CreditCard"), and that these child elements appear only once in the order named. The third line (line No. 3) indicates that the "PurchaseOrder" element has an "Id" attribute, and that if the attribute exists, its value must be unique within the XML document, and further that the attribute does not always have to exist. The fourth line (line No. 4) and fifth line (line No. 5) respectively indicate that arbitrary character strings are acceptable as the "UserID" and "Price" element values. The sixth line (line No. 6) indicates that the "CreditCard" element has four child elements ("Issuer", "Number", "Expire", and "Owner"), and that these child elements appear once only in the order named. The seventh line (line No. 7), eighth line (line No. 8), ninth line (line No. 9), and tenth line (line No. 10) respectively indicate that arbitrary character strings are acceptable as the "Issuer", "Number", "Expire", and "Owner" element values. It is assumed that the above document structure definition is named "PurchaseOrder.dtd" and stored in the document structure definition library 213.

FIG. 4 shows an example of an XML document that is consistent with the document structure definition "PurchaseOrder.dtd". For ease of explanation, however, the name space, which is contained in a normal XML document, is omitted from the example. The name space is used to maintain element name uniqueness within a single XML document. In the example that is formulated to assure element name uniqueness without the name space, no problem arises even when the name space is excluded.

The first line (line No. 1) in FIG. 4 indicates that this document is an XML document. The second line (line No. 2) indicates that the structure of the XML document is consistent with the definition "PurchaseOrder.dtd". The third line (line No. 3) and subsequent lines indicate the contents of the documents. The fourth line (line No. 4) indicates that the UserID element value is "10194970". The fifth line (line No. 5) indicates that the Price element value is "100000".

FIG. 5 shows some typical document structure alteration rules that are contained in the document structure alteration rule library 215. Three rules (rules 511, 512, and 513) are indicated in the figure. Each rule comprises a type 501, which indicates a conversion method, an applied location 502, which uses an element name to indicate the document structure definition targeted for conversion and the applied spot, an operation element 503, which results from conversion, relevant document structure definitions 504, which are document structure definition sources prevailing after conversion, and a document structure alteration rule number 505.

One of three different types ("Replace", "Add", or "Delete") is indicated as the type 501. However, the "Delete" type is not shown in FIG. 5. "Replace" means that the element indicated as the applied location 502 is to be replaced by the element indicated as the operation element 503. "Add" means that the element indicated as the operation element 503 is to be added to the location indicated as the applied location 502. "Delete" means that the element indicated as the applied location 502 is to be deleted. If the type is "Delete", the fields for the operation element 503 and relevant document structure definitions 504 may be left "blank".

The applied location 502 is expressed by a character string that comprises a character string indicating a document structure definition and a character string indicating a location within the definition. These two character strings are joined with a colon (:). The location within the document structure definition is expressed by a character string that is formulated by sequentially joining the tree structure root and subordinate element names including the specified element name with a slash (/)

A specific location within the tree structure may be expressed, instead of specifying a certain element, by using "first( )", which indicates a location prior to the leading child element of a certain element, "last( )", which indicates a location after the trailing child element of a certain element, "before( )", which indicates a location immediately before a certain element (between a certain element E and a sibling element D if sibling element D is located immediately before element E), or "after( )", which indicates a location immediately after a certain element (between a certain element E and a sibling element F if sibling element F is located immediately after element E). Further, "value( )", which represents a certain element value, may be used to express a specific location. It is also possible to express a range by joining contiguous sibling elements with the symbol "-". For example, "po.dtd:/po/value( )" denotes the value of the root element "po" for the document structure definition "po.dtd". On the other hand, "po.dtd:/po/one-three" denotes a range from the child element "one" to the child element "three" where the child elements "one" to "three" are contiguous child elements of the root element "po" for the document structure definition "po.dtd".

For example, "PurchaseOrder.dtd:/PurchaseOrder/CreditCard" under "Applied location" 502 for the first document structure alteration rule 511 indicates the child element "CreditCard", which belongs to the root element "PurchaseOrder" for the document structure definition "PurchaseOrder.dtd". "PurchaseOrder.dtd:/PurchaseOrder/last( )" under "Applied location" 502 for the second document structure alteration rule 512 indicates a location after the trailing child element, which belongs to the root element "PurchaseOrder" for the document structure definition "PurchaseOrder.dtd". Although the above special notation is used in the example, any notation can be used as far as it can indicate a specific document structure definition location.

The field for "Operation element" 503 uses the same notation as the field for "Applied location" 502 to express an element for replacement or addition. For example, the operation element "EncryptedData.dtd:/EncryptedData" for the first document structure alteration rule 511 indicates the root element "EncryptedData" for the document structure definition "EncryptedData.dtd".

The field for the relevant document structure definitions 504 indicates document structure definitions required for document structure conversion. This field may contain a plurality of document structure definitions. For example, the relevant document structure definition entry "EncryptedData.dtd KeyInfo.dtd" for the first document structure alteration rule 511 indicates that two document structure definitions ("EncryptedData.dtd" and "KeyInfo.dtd") relate to the first document structure alteration rule. All the document structure definitions appearing in the document structure alteration rule library 215, including the document structure definitions indicated in the field for the relevant document structure definitions 504, must be acquired beforehand and stored in the document structure definition library 213.

FIG. 6 shows an example of EncryptedData.dtd. FIG. 7 shows an example of EncryptedKey.dtd. FIG. 8 shows an example of Signature.dtd. FIG. 9 shows an example of KeyInfo.dtd. For explanation purposes, the contents of these examples are simplified in compliance with the XML document encryption specification (XML Encryption) and XML document signature specification (XML Signature), which are drawn up by the W3C (World Wide Web Consortium).

Figure 10:
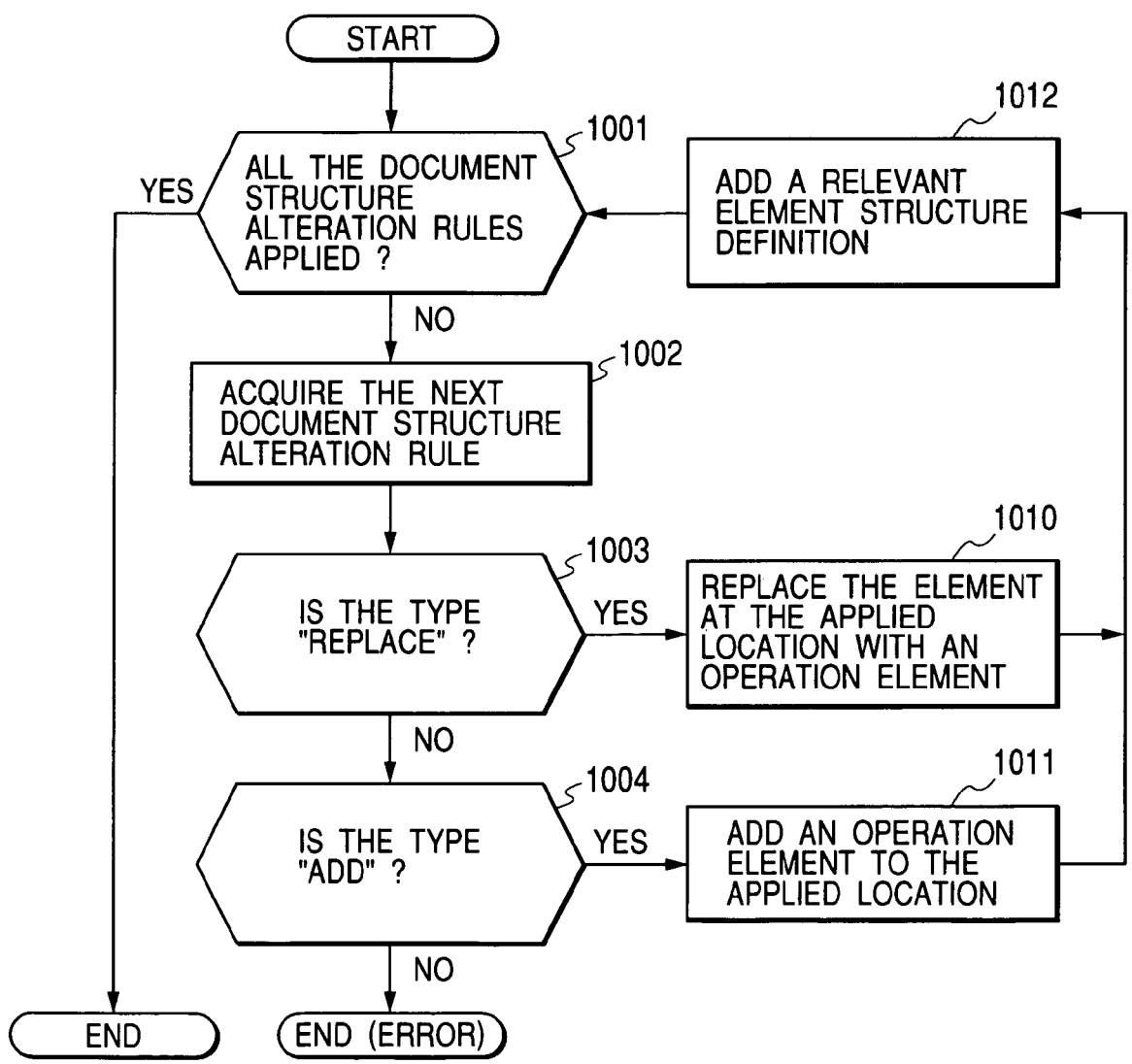
FIG. 10 is a flowchart illustrating the processing steps according to the first embodiment of the present invention.

FIG. 10 is a flowchart illustrating the processing steps that are performed by the document structure definition converter 214. The document structure definition converter 214 first judges whether all the document structure alteration rules have been applied to the received document structure definition describing the document structure (step 1001). If all the alteration rules have been applied, the document structure definition converter 214 terminates its process. If any alteration rule is unapplied, the document structure definition converter 214 acquires the next alteration rule that matches the applied location 502 (step 1002). When no more alteration rules are left unapplied, the document structure definition converter 214 terminates its process in accordance with the judgment formulated in step 1001. Next, the document structure definition converter 214 examines the type 501 of an acquired alteration rule. If the type is "Replace" (step 1003), the element written at the alteration rule's applied location 502 within the targeted document structure definition is replaced by the operation element 503 (step 1010). If the type is "Add" (step 1004), the operation element 503 is added to the alteration rule's applied location 502 within the targeted document structure definition (step 1011). After the replacement process (step 1010) and addition process (step 1011), the document structure definition converter 214 also adds to the document structure definition library 213 the replacement element, added element, and the element structure definitions used for defining the replacement element and added element (step 1012).

Application examples of the three document structure alteration rules 511, 512, 513 in FIG. 5 will now be described.

The first document structure alteration rule 511 is applied to the document structure definition "PurchaseOrder.dtd", which is shown in FIG. 3. FIG. 11 shows the resulting state. Since the type of the first document structure alteration rule 511 is "Replace" while the applied location is "PurchaseOrder.dtd:/PurchaseOrder/CreditCard" with the operation element set to "EncryptedData.dtd:/EncryptedData", the child element "CreditCard" (320 in FIG. 3) under the root element "PurchaseOrder" for "PurchaseOrder.dtd" is replaced by the root element "EncryptedData" (1121) for "EncryptedData.dtd". It is defined that the unconverted root element "PurchaseOrder" has three child elements, which are "UserID", "Price", and "CreditCard" (line No. 02 in FIG. 3). After conversion, the root element "PurchaseOrder" has three child elements, which are "UserID", "Price", and "EncryptedData" (line No. 02 in FIG. 11).

Lines No. 11 through 16 (1114) and 17 through 22 (1115) in FIG. 11 add the two document structure definitions "EncryptedData.dtd" and "KeyInfo.dtd", which are enumerated as the relevant document structure definitions 504 for the first document structure alteration rule 511, to the document structure definition "PurchaseOrder.dtd", which is targeted for application. In this example, the entities of the document structure definitions are added. Alternatively, however, only the references to the corresponding document structure definitions (information for identifying the document structure definitions) may be added with the entities stored in the document structure definition library 213 separately from "PurchaseOrder.dtd". The document structure definition 2201 shown in FIG. 22 is an example in which the document structure definition 1101 shown in FIG. 11 is expressed by using the references to the document structure definitions "EncryptedData.dtd" and "KeyInfo.dtd". Lines No. 11 and 12 (2211) in FIG. 22 use references to express the portions corresponding to lines No. 11 through 16 (1114) in FIG. 11. Lines No. 13 and 14 (2212) in FIG. 22 use references to express the portions corresponding to lines No. 17 through 22 (1115) in FIG. 11. FIG. 11 shows an example in which some of the document structure definition elements in a structured document are replaced by document structure definition elements corresponding to encrypted elements.

Since the "CreditCard" element is rendered unnecessary by the element replacement process, its definition (line No. 06) and the child elements for "CreditCard" (lines No. 07 through 10 (1113) in FIG. 11) may be deleted from the document structure definition "PurchaseOrder.dtd".

FIG. 12 shows the document structure definition "PurchaseOrder.dtd" to which the second document structure alteration rule 512 has been applied. Since the type of the second document structure alteration rule 512 is "Add" while the applied location is "PurchaseOrder.dtd:/PurchaseOrder/last( )" with the operation element set to "EncryptedKey.dtd:/EncryptedKey", the root element "EncryptedKey" for "EncryptedKey.dtd" is added as the last element for the root element "PurchaseOrder" of "PurchaseOrder.dtd" (1211 of line No. 02 in FIG. 12). Further, the document structure definition "EncryptedKey.dtd", which is enumerated as a relevant document structure definition for the second document structure alteration rule, is added to the document structure definition "PurchaseOrder.dtd", which is targeted for application (lines No. 23 through 29 (1212) in FIG. 12).

Finally, FIG. 13 shows the document structure definition "PurchaseOrder.dtd" to which the third document structure alteration rule 513 has been applied. In the example shown in FIG. 13, the root element "Signature" for "Signature.dtd" is added as the last element for the "PurchaseOrder" element (1331 of line No. 02) with the structure definition (1312 of lines No. 30 through 41) for the "Signature" element added. The element added in FIG. 13 is an example of an element corresponding to an digital signature affixed to a structured document.

Now that all the document structure alteration rules in the document structure alteration rule library 215 have been applied, the document structure definition converter 214 terminates its process.

When the above document structure conversion process is completed, it is possible to conduct a structure inspection of a structured document shown in FIG. 4 after it is encrypted and electronically signed (FIG. 14). Lines No. 06 through 15 (1411) in FIG. 14 show an encrypted "CreditCard" element. Lines No. 16 through 27 (1412) show key information used for encryption. Lines No. 28 through 41 (1413) show a signature.

The above example merely shows a document structure alteration rule for changing the "PurchaseOrder.dtd" structure. Alternatively, however, it is possible to define a document structure alteration rule that changes the structure of a document structure definition other than "PurchaseOrder.dtd" shown in FIG. 15.

Reference numeral 1511 in FIG. 15 shows an digital signature method. It is an example of a document structure alteration rule that corresponds to a method for causing a signature to include a document targeted for signature (this method is generally referred to as a "enveloping signature").

FIG. 16 shows an example of document structure definition conversion for a situation where the above signature method is applied. Since the type of document structure alteration rule 1511 is "Add" while the applied location is "Signature.dtd:/Signature/last( )" with the operation element set to "PurchaseOrder.dtd:/PurchaseOrder", the root element "PurchaseOrder" for the document structure definition "PurchaseOrder.dtd" is added to line No. 02 as the last child element for the root element "Signature" of the document structure definition "Signature.dtd" (1611). Further, "PurchaseOrder.dtd" and "KeyInfo.dtd", which are enumerated as the relevant document structure definitions, are added to "Signature.dtd" as lines No. 14 through 22 (1612) and 23 through 28 (1613). When this document structure alteration rule is applied, the root element for the received document is changed to "Signature".

As described above, the first embodiment of the present invention makes it possible to conduct a structure inspection of the entire structured document even when the document structure is altered by signing or encrypting the structured document wholly or partly or when encrypted portions cannot be decrypted by an inspector.

Figure 17:
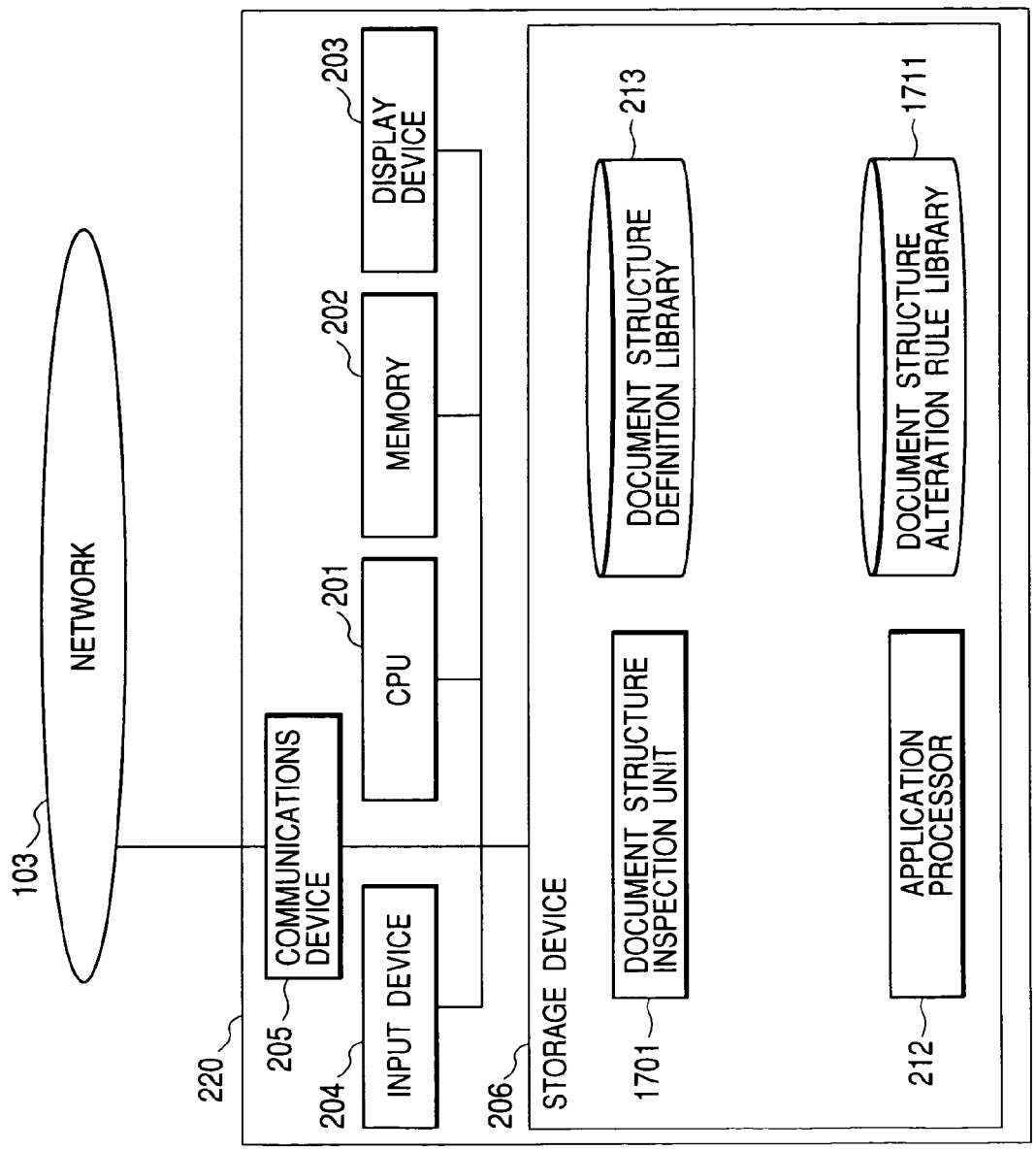
FIG. 17 illustrates the internal hardware configuration of a computer according to a second embodiment of the present invention.

A second embodiment of the present invention will now be described with reference to the accompanying drawings. FIG. 17 illustrates the hardware configuration of the second embodiment according to the present invention. The hardware configuration of the second embodiment according to the present invention is basically the same as that of the first embodiment. The differences lie in the structure inspection processing steps, which are performed by a document structure inspection unit 1701 within the storage device 206, and in the data structure of a document structure alteration rule library 1711.

FIG. 18 shows some typical document structure alteration rules that are contained in the document structure alteration rule library 1711. Four rules (rules 1811, 1812, 1813, and 1814) are indicated in the figure. Each rule comprises a type 1801, which indicates a conversion method, an applied definition 1802, which indicates an applied document structure definition, an operation element 1803, which is targeted for conversion, relevant document structure definitions 1804, which are required for document structure inspection after conversion, and a document structure alteration rule number 1805.

Either "Replace" or "Add" is indicated as the type 1801. "Replace" means that part of the document structure definition indicated as the applied definition 1802 may be replaced by the document structure definition element indicated as the operation element 1803. "Add" means that the document structure definition element indicated as the operation element 1803 may be added to part of the document structure definition indicated as the applied definition 1802. In the field for the applied definition 1802, either a document structure definition name or the symbol "*" is written. The symbol "*" means that any document structure definition is acceptable as the applied definition. The notations for the operation element 1803 and relevant document structure definitions 1804 conform to those for the operation element 503 and relevant document structure definitions 504 that are shown in FIG. 5 and described in conjunction with the first embodiment.

Figure 19:
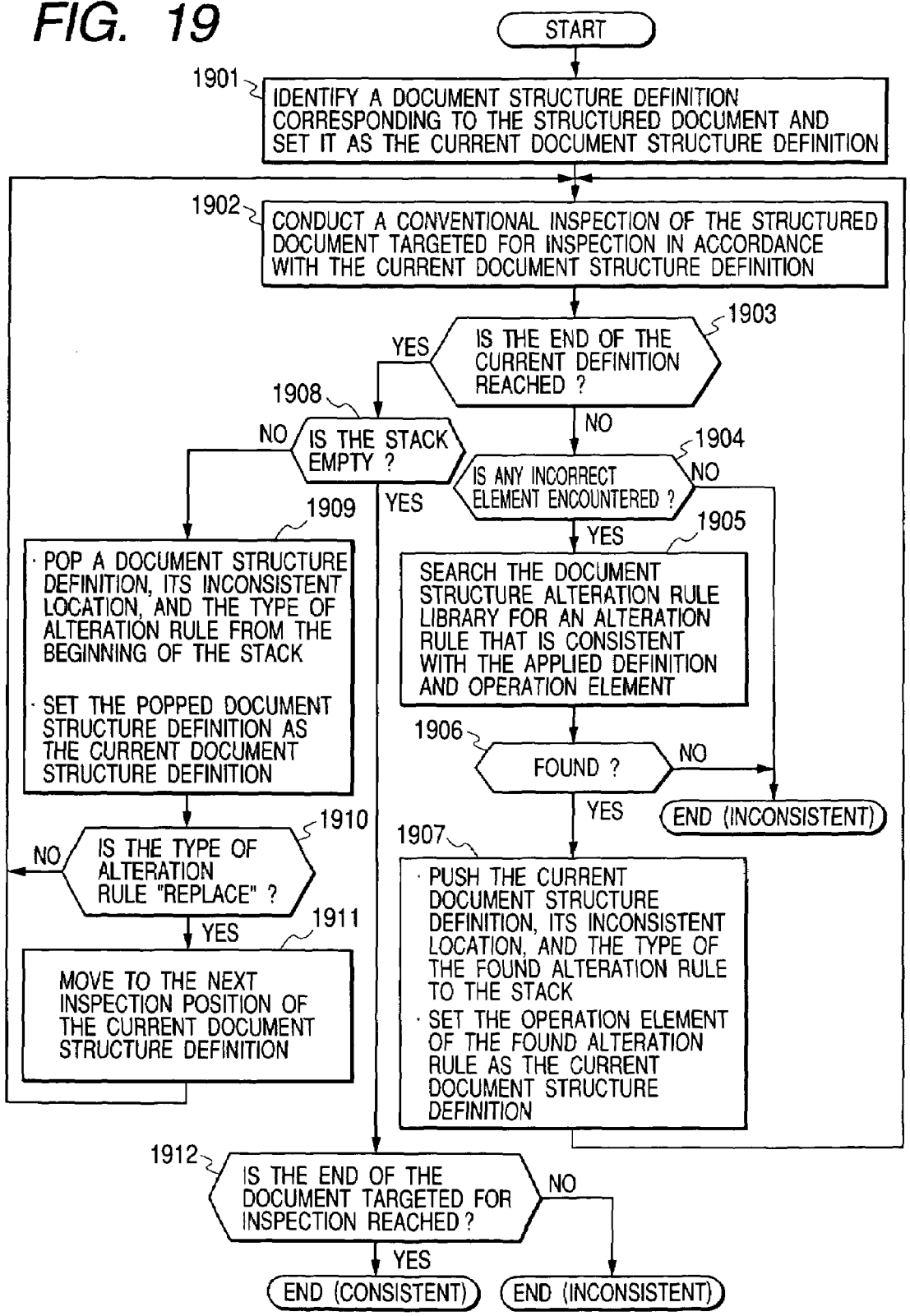
FIG. 19 is a flowchart illustrating in detail the processing steps for document structure inspection.

FIG. 19 is a flowchart illustrating the processing steps that are performed by the document structure inspection unit 1701. The document structure inspection unit 1701 first identifies a document structure definition that corresponds to a structured document targeted for inspection, and sets it as the current document structure definition (step 1901). The document structure inspection unit 1701 places the inspection positions for both the structured document targeted for inspection and the document structure definition at the beginning. Next, the document structure inspection unit 1701 conducts an inspection by sequentially shifting the inspection position to determine whether the structured document targeted for inspection is consistent with the current document structure definition (step 1902). If the inspection reaches the end of the current document structure definition or the end of the structured document targeted for inspection or if an error occurs, step 1902 ends so that step 1903 is initiated. The "end of the current document structure definition" does not denote the last line of the current document structure definition but indicates the "end of the root element definition in the associated document structure definition".

Step 1903 is performed to determine whether the end of the current document structure definition is reached by the inspection. If the end of the current document structure definition is not reached by the inspection, the cause of an abnormal end is identified. More specifically, step 1904 is performed to check whether the abnormality is caused by the "appearance of an illegal element". If not, the result is returned to indicate an "inconsistency". If the element names targeted for comparison do not match, the first embodiment concludes that an "inconsistency" is encountered. The second embodiment, on the other hand, concludes that an "illegal element" has appeared. If the abnormality is caused by the "appearance of an illegal element", step 1905 is performed to search the document structure alteration rule library for an applicable document structure alteration rule. The term "applicable" means that the current document structure definition is consistent with the "applied definition" for the document structure alteration rule, and that the illegal element appearing in the structured document targeted for inspection is consistent with the "operation element" for the document structure alteration rule. However, if the symbol is indicated as the "applied definition", it indicates that every document structure definition is complied with.

If no applicable document structure definition is found in step 1905, step 1906 is performed to return the result to indicate an "inconsistency". If an applicable document structure definition is found in step 1905, step 1907 is performed to simultaneously push the name of the current document structure definition, its inconsistent location, and the type of the found document structure alteration rule to the stack, and set the document structure definition of the operation element of the found document structure alteration rule as the current document structure definition. In the present embodiment, however, the notation used for indicating the inconsistent location is the same as that for indicating the applied location 502 for a document structure alteration rule according to the first embodiment. The document structure inspection unit 1701 then returns to step 1902 and continues with the inspection process.

If the inspection process ends normally in step 1903, step 1908 is performed to check the stack status. If the stack is empty and the end of the structured document targeted for inspection is reached (the question in step 1912 is answered "Yes"), the document structure inspection unit 1701 returns "consistency" and ends normally. If, on the other hand, the end of the structured document targeted for inspection is not reached in step 1912, the document structure inspection unit 1701 returns "inconsistency" and ends.

If the stack is not empty in step 1908, the document structure definition, inconsistent location, and alteration rule type are popped from the beginning of the stack, and the popped document structure definition is set as the current document structure definition (step 1909). Step 1909 is then performed to check whether the popped alteration rule type is "Replace". If the popped alteration rule type is not "Replace", the document structure inspection unit 1701 returns to step 1902 and continues with the inspection process. If, on the other hand, the popped alteration rule type is "Replace", the document structure inspection unit 1701 moves the inspection position for the current document structure definition to the next sibling element. If the next sibling element is not found, step 1911 is performed to move the inspection position to a location immediately after the current element. When the alteration rule popped in step 1909 is not "Replace" or after completion of step 1911, the document structure inspection unit 1701 proceeds to step 1902 and continues with the inspection process.

The document structure inspection process performed as indicated in FIG. 19 to inspect the structured document shown in FIG. 14 will now be described.

It is assumed that the document structure definition library 213 stores "PurchaseOrder.dtd" in FIG. 3, "EncryptedData.dtd" in FIG. 6, "EncryptedKey.dtd" in FIG. 7, "Signature.dtd" in FIG. 8, and "KeyInfo.dtd" in FIG. 9, and that the document structure alteration rule library 1711 stores the four rules shown in FIG. 18.

First, step 1901 is performed to identify the document structure definition as "PurchaseOrder.dtd" from the second line of the structured document targeted for inspection (1401 in FIG. 14). Next, step 1902 is performed to conduct a regular inspection until an error occurs or the inspection ends. In the currently employed example, the inspection process is performed normally between the third line and fifth line. However, when the element name "EncryptedData" in the sixth line is reached, an error occurs because it is inconsistent with the element name "CreditCard", which is indicated in the second line of the document structure definition (FIG. 3). Since this error is caused by the appearance of the illegal element "EncryptedData", the document structure inspection unit 1701 proceeds to step 1905 and searches the document structure alteration rule library 1711 for a document structure alteration rule in which the applied definition is consistent with the current document structure definition "PurchaseOrder.dtd" and the operation element is consistent with "EncryptedData". As a result of the search, the first document structure alteration rule 1811 shown in FIG. 18 is retrieved. The applied definition for the first document structure alteration rule 1811 is indicated by the symbol "*". Since it is consistent with any document structure alteration rule, it is consistent with "PurchaseOrder.dtd" as well.

Next, step 1907 is performed to push the current document structure definition "PurchaseOrder.dtd", the inconsistent location "/PurchaseOrder/CreditCard", and the type "Replace" for document structure alteration rule 1, which is found, to the stack, as indicated in FIG. 20. "PurchaseOrder.dtd|/PurchaseOrder/CreditCard|Replace" (2001) is stored at the beginning (top) of the stack. Next, the operation element "EncryptedData.dtd:/EncryptedData" for document structure alteration rule 1, which is found in step 1905, is set as the current document structure definition. The document structure inspection unit 1701 then returns to step 1902 and continues with the inspection process.

Next, step 1902 is performed to conduct an inspection of the "EncryptedData" element (line No. 02) for the document structure definition "EncryptedData.dtd" in FIG. 6 and lines No. 06 and beyond of the structured document targeted for inspection 1401 in FIG. 14. When this inspection reaches the end of line No. 15 of the structured document targeted for inspection 1401, the end of the document structure definition 601 is reached. Therefore, the question in step 1903 is answered "Yes" to initiate a stack inspection. Since the stack is not empty as it stores the information 2001 that was pushed in step 1907, the document structure inspection unit 1701 proceeds to step 1909 and pops the information 2001 at the beginning of the stack. The stack is emptied by this process.

Next, the document structure inspection unit 1701 sets the current document structure definition to the previously popped document structure definition "PurchaseOrder.dtd" and the inspection location to "/PurchaseOrder/CreditCard". The document structure inspection unit 1701 then proceeds to step 1911 because the type of the document structure alteration rule popped in step 1909 is "Replace". Step 1911 is performed so as to select the next sibling element as the inspection position for the current structure definition that was set in step 1909 to "/PurchaseOrder/CreditCard". However, the next sibling element does not exist for the CreditCard element. Therefore, the inspection position is set to "a location immediately after the CreditCard element (/PurchaseOrder/CreditCard/after( ))". The document structure inspection unit 1701 then proceeds to step 1902 and continues with the inspection process.

The inspection position is now set at "/PurchaseOrder/CreditCard/after( )" for the current document structure definition "PurchaseOrder.dtd", whereas the inspection position for the structured document targeted for inspection (1401 in FIG. 14) is at the end of line No. 15.

When the inspection process is continuously performed in step 1902, the illegal element "EncryptedKey" is found to appear in line No. 16 of the structured document targeted for inspection (1401 in FIG. 14). Therefore, the document structure inspection unit 1701 proceeds to step 1905 to search the document structure alteration rule library 1711 for a document structure alteration rule whose operation element is consistent with the applied definition. Since the current search retrieves the second document structure alteration rule 1812 shown in FIG. 18, "PurchaseOrder.dtd|/PurchaseOrder/CreditCard/after( )|Add" is pushed to the stack. The resulting stack status is shown in FIG. 21.

Further, the document structure inspection unit 1701 sets the current document structure definition to "EncryptedKey.dtd" and the inspection position to the "EncryptedKey" element, and then proceeds to step 1902 to continue with the inspection process.

In step 1902, the end of the current document structure definition "EncryptedKey.dtd" is reached when the inspection reaches the end of line No. 27 of the structured document targeted for inspection 1401 shown in FIG. 14. Therefore, the process proceeds to step 1908. Next, the document structure inspection unit 1701 pops the stack's leading information "PurchaseOrder.dtd|immediately after the CreditCard element in the second line|Add" from the stack, and sets the current document structure definition and the inspection position to "PurchaseOrder.dtd" and "/PurchaseOrder/CreditCard/after( )", respectively. Since the currently popped type is "Add", the document structure inspection unit 1701 proceeds to step 1902 and continues with the inspection process.

If the inspection process is continuously performed in step 1902, the illegal element "Signature" appears while the inspection position for the structured document targeted for inspection remains unchanged. Therefore, the document structure inspection unit 1701 proceeds to step 1905 to search the document structure alteration rule library 1711 for a document structure alteration rule whose operation element is consistent with the applied definition. Since the current search retrieves the third document structure alteration rule 1813 shown in FIG. 18, "PurchaseOrder.dtd|/PurchaseOrder/CreditCard/after( )|Add" is pushed to the stack. Further, the document structure inspection unit 1701 sets the current document structure definition to "Signature.dtd" and the inspection position to "Signature", proceeds to step 1902, and continues with the inspection process.

In step 1902, the end of the current document structure definition "Signature.dtd" is reached when the inspection reaches the end of line No. 41 of the structured document targeted for inspection 1401. Therefore, the process proceeds to step 1908. Next, the document structure inspection unit 1701 pops the stack's leading information "PurchaseOrder.dtd|/PurchaseOrder/CreditCard/after( )|Add", and sets the current document structure definition and the inspection position to "PurchaseOrder.dtd" and "/PurchaseOrder/CreditCard/after( )", respectively. The stack is emptied by this process. Since the currently popped type is "Add", the document structure inspection unit 1701 proceeds to step 1902 and continues with the inspection process.

In step 1902, the end of the current document structure definition "PurchaseOrder.dtd" is reached when the inspection reaches the end of line No. 42 of the structured document targeted for inspection 1401. Therefore, the process proceeds to step 1908. Since the stack is empty and the end of the structured document targeted for inspection is reached (the end of line No. 42 is reached), the document structure inspection unit 1701 terminates the inspection process and returns the result to indicate a "consistency".

The inspection process is now completed for the structured document targeted for inspection 1401. The fourth document structure alteration rule 1814 has not been applied to the inspection of the structured document targeted for inspection 1401. The fourth document structure alteration rule is to be used when an inspection is conducted of a structured document in which a signature includes a document targeted for signature (a structured document consistent with the document structure definition shown in FIG. 16).

As described above, the second embodiment of the present invention makes it possible to conduct a structure inspection of the entire structured document even when the document structure is altered by signing or encrypting the structured document wholly or partly or when encrypted portions cannot be decrypted by an inspector.

The first and second embodiments assume that all document structure definitions are written in a single document structure definition language, that is, DTD. However, a structured document targeted for inspection can be subjected to a structure inspection even when document structure definitions are written in a plurality of document structure definition languages. More specifically, such a structure inspection can be conducted by identifying the type of document structure definition language used for writing the document structure definitions and selecting an appropriate document structure inspection unit when the first embodiment acquires the entity of a document structure definition by using a reference to it (2211, 2212) or when the second embodiment performs step 1902. The type of document structure definition language can be determined according to the document structure definition name.

For example, the document structure definition named "PurchaseOrder.dtd" may indicate that it is written in DTD because the employed extension is "dtd". The document structure definition named "Signature.xsd" may indicate that it is written in "W3C XML Schema" because the employed extension is "xsd".

Further, when a plurality of document structure definition languages are used to write document structure definitions, the structure inspection of a structured document targeted for inspection can also be conducted by converting document structure definitions stored in the document structure definition library 213 in such a manner that they are written in a single document structure definition language.

The present invention makes it possible to conduct a structure inspection of the entire structured document even when the document structure is altered by signing or encrypting the structured document wholly or partly and no matter whether encrypted portions can be decrypted by an inspector.

What is claimed is:

1. A document structure inspection method comprising the steps of:
   conducting a first inspection on an individual element name basis to determine whether a structured document is consistent with a corresponding first document structure definition written in a document structure definition language;
   in the case that an inconsistency occurs during the first inspection, suspending the first inspection and searching a document structure alteration rule library that is a collection of a plurality of document structure alteration rules for an applicable document structure alteration rule based on an inconsistent element name that appears in the structured document;
   wherein said document structure alteration rule sets a type indicating "add" or "replace," an applied definition, an operation element and a relevant document structure definition of a second document structure definition, the type indicating "add" designates an element to be added in the second document structure definition and the type indicating "replace" designates an element to be replaced in the second document structure definition corresponding to the inconsistent element name;
   conducting a second inspection on an individual element name basis by use of the second document structure definition corresponding to the inconsistent element name in the document structure alteration rule found through the search; and
   when the second inspection has reached the end of the second document structure definition, resuming the first inspection from the inconsistent element of the first document structure definition if the type of the used second document structure definition is "add" or from an inspection position next to the inconsistent element of the first document structure definition if the type of the used second document structure definition is "replace".

2. A document structure inspection apparatus, comprising:
   means for conducting a first inspection on an individual element name basis to determine whether a structured document is consistent with a corresponding first document structure definition written in a document structure definition language;
   means for suspending the first inspection, in the case tat an inconsistency occurs during the first inspection, and searching a document structure alteration rule library that is a collection of a plurality of document structure alteration rules for an applicable document structure alteration rule based on an inconsistent element name that appears in the structured document;
   wherein said document structure alteration rule sets a type indicating "add" or "replace," an applied definition, an operation element and a relevant document structure definition of a second document structure definition, the type indicating "add" designates an element to be added in the second document structure definition and the type indicating "replace" designates an element to he replaced in the second document structure definition corresponding to the inconsistent element name;

means for conducting a second inspection on an individual element name basis by use of the second document structure definition corresponding to the inconsistent element name in the document structure alteration rule found through the search; and means for resuming the first inspection, when the second inspection has reached the end of the second document structure definition, from the inconsistent element of the first document structure definition if the type of the used second document structure definition is "add" or from an inspection position next to the inconsistent element of the first document structure definition if the type of the used second document structure definition is "replace".

3. A computer program stored on a computer storage device for causing a computer to implement the functions of:

conducting a first inspection on an individual element name basis to determine whether a structured document is consistent with a corresponding first document structure definition written in a document structure definition language;

in the case that an inconsistency occurs during the first inspection, suspending the first inspection and searching a document structure alteration rule library that is a collection of a plurality of document structure alteration rules for an applicable document structure alteration rule based on an inconsistent element name that appears in the structured document;

wherein said document structure alteration rule sets a type indicating "add" or "replace," an applied definition, an operation element and a relevant document structure definition of a second document structure definition, the type indicating "add" designates an element to be added in the second document structure definition and the type indicating "replace" designates an element to be replaced in the second document structure definition corresponding to the inconsistent element name;

conducting a second inspection on an individual element name basis by use of the second document structure definition corresponding to the inconsistent element name in the document structure alteration rule found through the search; and when the second inspection has reached the end of the second document structure definition, resuming the first inspection from the inconsistent element of the first document structure definition if the type of the used second document structure definition is "add" or from an inspection position next to the inconsistent element of the first document structure definition if the type of the used second document structure definition is "replace".

* * * * *